United States Patent
Peeters et al.

(10) Patent No.: US 10,416,925 B2
(45) Date of Patent: Sep. 17, 2019

(54) DISTRIBUTING COMPUTING SYSTEM IMPLEMENTING A NON-SPECULATIVE HARDWARE TRANSACTIONAL MEMORY AND A METHOD FOR USING SAME FOR DISTRIBUTED COMPUTING

(71) Applicant: COMMISSARIAT A L'ENERGIE ATOMIQUE ET AUX ENERGIES ALTERNATIVES, Paris (FR)

(72) Inventors: Julien Peeters, Leves (FR); Nicolas Ventroux, Massy (FR); Tanguy Sassolas, Paris (FR); Marc Shapiro, Paris (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 15/118,028

(22) PCT Filed: Apr. 9, 2015

(86) PCT No.: PCT/EP2015/057733
§ 371 (c)(1),
(2) Date: Aug. 10, 2016

(87) PCT Pub. No.: WO2015/155294
PCT Pub. Date: Oct. 15, 2015

(65) Prior Publication Data
US 2017/0017435 A1    Jan. 19, 2017

(30) Foreign Application Priority Data
Apr. 10, 2014 (FR) ...................... 14 53216

(51) Int. Cl.
*G06F 3/06* (2006.01)
*G06F 9/46* (2006.01)
(Continued)

(52) U.S. Cl.
CPC ............ *G06F 3/0659* (2013.01); *G06F 3/061* (2013.01); *G06F 3/067* (2013.01); *G06F 9/467* (2013.01);
(Continued)

(58) Field of Classification Search
CPC .................................................. G06F 9/52–528
See application file for complete search history.

(56) References Cited

U.S. PATENT DOCUMENTS

| 5,742,785 A | 4/1998 | Stone et al. |
| 2009/0077329 A1* | 3/2009 | Wood ................. G06F 12/0815 711/156 |

(Continued)

FOREIGN PATENT DOCUMENTS

WO    2013/147898 A1    10/2013

OTHER PUBLICATIONS

M. Herliy et al., "Transactional Memory: Architectural Support for Lock-Free Data," 20th Annual Symposium on Computer Architecture, Dec. 1, 1992, pp. 289-300.
(Continued)

*Primary Examiner* — Edward J Dudek, Jr.
*Assistant Examiner* — Andrew Russell
(74) *Attorney, Agent, or Firm* — Baker & Hostetler LLP

(57) ABSTRACT

A distributed computation system comprising computation units and memory shared between computation units, comprises a hardware module for detecting conflicts of access of computation units to shared memory; each hardware module for detecting conflicts configured to: store a probabilistic data structure, indicative of the addresses of shared memory involved in the current transactions; receive at least one message indicative of request for access, by one computation unit to an address of shared memory; determine, from a probabilistic data structure, whether the address is already (Continued)

involved in a current transaction, and transmit a message indicating presence or absence of access conflicts; receive a message indicative or confirmative of reservation or releasing of an address of shared memory, and update the probabilistic data structure for the reserved addresses and the released addresses to be considered, as being/not being involved in a current transaction. A method for using the system is provided.

13 Claims, 7 Drawing Sheets

(51) Int. Cl.
  *G06F 9/52* (2006.01)
  *G06F 13/16* (2006.01)
(52) U.S. Cl.
  CPC .......... *G06F 9/528* (2013.01); *G06F 13/1663* (2013.01)

(56) References Cited

U.S. PATENT DOCUMENTS

| | | | |
|---|---|---|---|
| 2009/0133032 A1 | 5/2009 | Biles et al. | |
| 2009/0183159 A1 | 7/2009 | Michael et al. | |
| 2010/0332768 A1* | 12/2010 | Gray | G06F 11/362 711/146 |
| 2014/0032848 A1* | 1/2014 | Zhao | G06F 12/084 711/130 |
| 2014/0089271 A1* | 3/2014 | Al-Otoom | G06F 9/44 707/690 |

OTHER PUBLICATIONS

Nir Shavit et al., "Software Transactional Memory," Proceedings of the 14th ACM Symposium on Principles of Distributed Computing, 1995, pp. 204-213.

Minh et al., "An effective hybrid transactional memory system with strong isolation guarantees," ACM SIGARCH Computer Architecture News, Jun. 9, 2007, pp. 69-80, XP055167048.

* cited by examiner

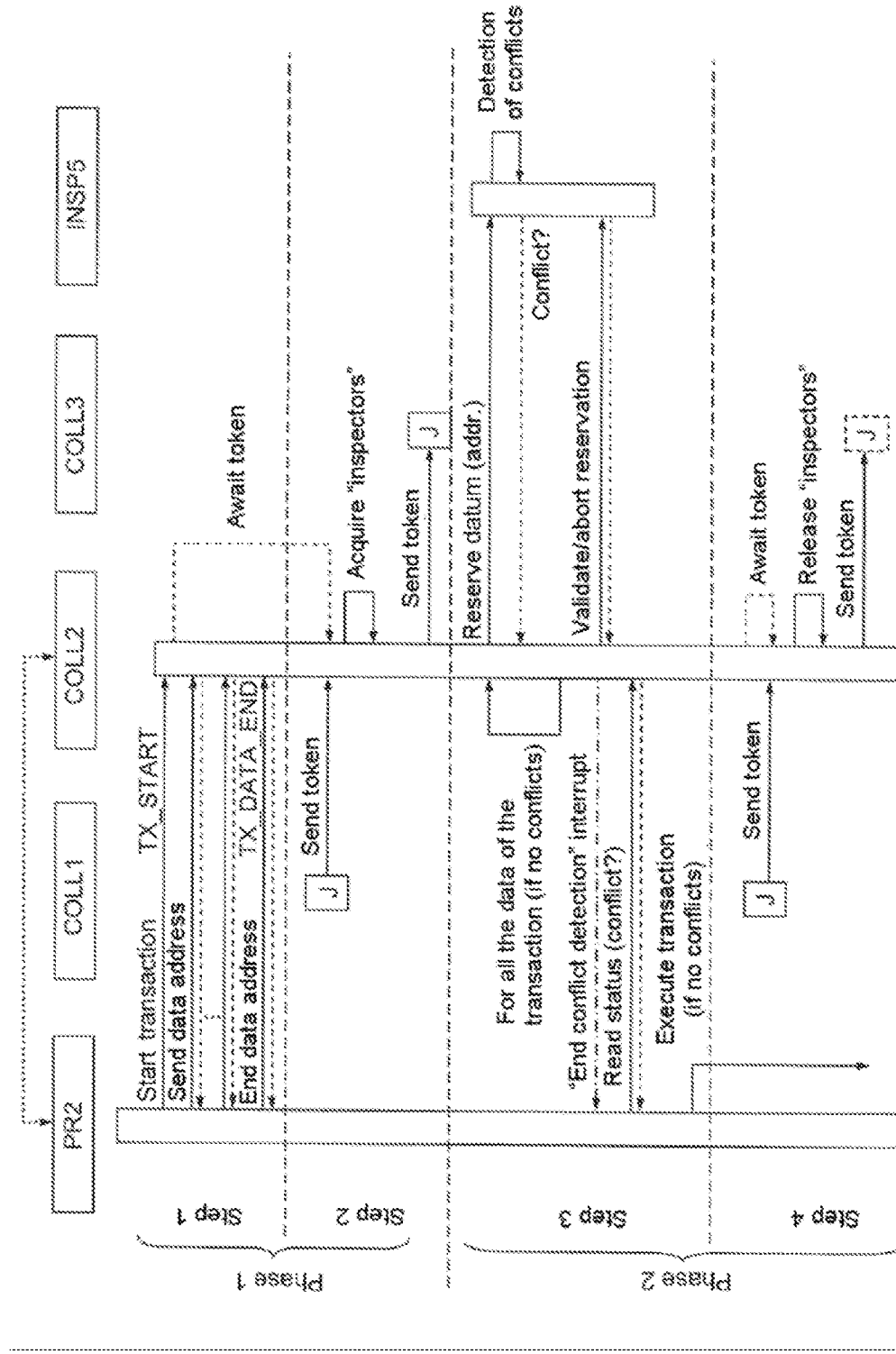

DISTRIBUTING COMPUTING SYSTEM IMPLEMENTING A NON-SPECULATIVE HARDWARE TRANSACTIONAL MEMORY AND A METHOD FOR USING SAME FOR DISTRIBUTED COMPUTING

CROSS-REFERENCE TO RELATED APPLICATIONS

This application is a National Stage of International patent application PCT/EP2015/057733, filed on Apr. 9, 2015, which claims priority to foreign French patent application No. FR 1453216, filed on Apr. 10, 2014, the disclosures of which are incorporated by reference in their entirety.

FIELD OF THE INVENTION

The invention relates to a distributed computation system implementing a hardware transactional memory of non-speculative type, and a method for using same for distributed computation systems.

It relates to the field of parallel computer architectures, on chip or organized as a computation grid. It relates in particular to distributed, shared and/or redundant computation systems for embedded applications or applications such as cloud computing, databases, web servers, intensive computation, etc.

BACKGROUND

In order to meet the increasing needs in terms of application performance, the number of computation resources (processors or processor cores) in parallel architectures is constantly increasing. This raises both the need for and the issue of effectively programming this type of architecture to best benefit from the available computation power.

When running a parallel application, it may be that two or more tasks have to exchange so-called shared data. To guarantee a coherence of the system all the time the application is running, access to the memory system has to be protected. For that, the programmer declares regions in the code of the application, called critical sections, which guarantee an exclusive access to the memory system for any task which obtains the right therefor.

The shared memory model, predominant these days, is based on the use of synchronization primitives based on locks (or any variant likened to a lock) to protect the access to the shared data within the critical sections. However, these primitives execute upscaling with difficulty. This limitation increases the complexity of the programming of the parallel applications and requires a significant investment in time to achieve an acceptable performance level. Furthermore, placing a lock at the start of a critical section guarantees only the exclusive access thereto, and not to the actual shared data. Consequently, the use of a lock does not guarantee the effective protection of the shared data between the tasks but only the exclusive access to the sequence of instructions which uses them. The responsibility for delimiting the critical sections is left to the programmer which is a source of significant errors.

In order to best exploit the computation power present in the massively parallel modern architectures, a more promising approach involves the use of transactional memories. A transactional memory transforms each access to the memory system into a "transaction" which has the following properties: atomicity, coherence, isolation and durability (hence the acronym "A.C.I.D.").

"Atomicity" means that the simultaneous execution of several transactions must give the same result as the successive execution thereof.

"Coherence" means that a transaction must bring the system from one valid state to another valid state.

"Isolation" means that the updates of shared data used by the transaction are propagated to the rest of the system only once the transaction is finished and therefore validated.

"Durability" means that the updates, once propagated, can no longer be canceled.

The concept of transactional memory was introduced in 1993 through the paper by M. Herliy and J. E. B. Moss "*Transactional Memory: Architectural Support for Lock-Free Data*", 20th Annual Symposium on Computer Architecture, pages 289-300. This paper discloses in particular a hardware device for implementing a transactional memory, based on an associative cache memory. A notable drawback of this solution is that it is a blocking solution.

The paper by Nir Shavit and Dan Touitou "*Software Transactional Memory*" Proceedings of the 14th ACM Symposium on Principles of Distributed Computing, pages 204-213 has proposed a purely software and non-blocking realization of a transactional memory.

These transactional memories known from the prior art are of "speculative" type. That means that a transaction is initiated by making the assumption that it will not lead to a conflict of access to the shared memory; if such a conflict is detected during execution, the transaction is canceled without leaving traces (to observe the property of isolation). In a speculative transactional memory, the means necessary to guarantee the coherence of the system are very costly in terms of memory imprint (memory space necessary to back up the valid state of the system before starting the transaction), of management of the returns on error in case of incorrect speculation, etc. Thus, these means are unsuited to fields like embedded systems. More generally, they needlessly consume resources which could be allocated to computation tasks.

The realization, by software, of non-speculative transactional memories, in which any conflicts are detected before the start of execution of a transaction, is also known. The use of non-speculative transactional memories makes it possible to reduce the memory imprint and increase the energy efficiency of the system by comparison to the speculative approach. However, because of the absence of speculation, all the data accessed by a transaction must be reserved in one go (that is to say atomically) before the first operation of the transaction is executed, this being so as to guarantee the absence of deadlocks in the reservation; the absence of deadlocks in the reservation guaranteeing the "A.C.I.D." properties. Furthermore, in the general case, a transaction can access an arbitrary number of data which presupposes the possibility of atomically reserving an arbitrary and variable number of data. Now, the atomic reservation of several data in an intrinsically parallel system such as a multiprocessor computation architecture is a non-trivial problem to be resolved. The reservation comprises two major parts: the declaration of the data set to be reserved and the detection of conflicts between this set and any other data set already reserved by one or more other transactions. A naïve and simplistic realization would consist in using a global lock which stops the execution of the entire system for the time of the reservation, which creates a total order between the reservations of a same datum and prevents the occurrence of a deadlock; however, this solution would lead to an unacceptable degradation of performance; in particular, it takes no account of the case where two transactions reserve two totally separate data sets.

Document U.S. Pat. No. 5,742,785 describes a multiple data reservation mechanism via dedicated hardware registers, associated with each computation unit. The mechanism makes it possible to check that data are reserved and to then proceed to write them atomically in memory. Nevertheless, the reservation of the data is not, in itself, atomic. In effect, for a starting data set, the reservation of certain data can fail and, if appropriate, update a validity flag linked to each non-reserved datum. The absence of atomic reservation for a data set does not satisfy the conditions necessary and sufficient to realize a non-speculative transactional memory.

Document WO 2013/147898 discloses a multi-core processor comprising a hardware tracing device for recording interactions between threads having access to a shared memory. This hardware tracing device uses, for each processor, two non-counting Bloom filters for separately storing the read and write accesses to the shared memory of a set of accesses. They are intended to identify the memory access conflicts on the reception of coherence messages from the other cores. The conflict is characterized by the addresses affected by the coherence message belonging to the two Bloom filters.

Document US 2009/0183159 discloses a method for managing concurrent transactions implemented by computer and using software Bloom filters. Since the detection of conflicts is performed by comparing the transactions two by two, this approach risks leading to considerable slowdowns if the number of transactions is high.

Document US 2009/0133032 discloses a data processing method and apparatus using a plurality of processors and implementing a transactional memory. By taking into account access conflicts detected in the past it becomes possible, through a kind of learning, to minimize the risks of collision between the future transactions.

The paper by Chi Cao Minh et. al. "An Effective Hybrid Transactional Memory System with Strong Isolation Guarantees", SIGARCH Computer Architecture News 35, 2 (June 2007), pp. 69-80 describes a mechanism which makes it possible to accelerate the search for conflicts in the context of speculative transactional memories. The acceleration is provided by the presence of hardware Bloom filters of conventional (non-counting) type in support of a software transactional system. This hardware accelerator does not make it possible to reserve multiple data atomically.

SUMMARY OF THE INVENTION

The invention aims to remedy the abovementioned drawbacks of the prior art. More particularly, it aims to realize, efficiently and effectively, a non-speculative transactional memory that makes it possible to reserve—in a non-blocking manner—a data set of variable and arbitrary size. According to a particularly advantageous aspect, the invention implements a hardware and distributed conflict detection method that has a fixed cost in terms of silicon surface area regardless of the number of data manipulated. Furthermore, the proposed conflict detection method makes it possible to separately manage the separate transactions, thus offering an additional and indispensible performance gain for upscaling.

A subject of the invention is therefore a distributed computation system comprising a plurality of computation units and at least one shared memory shared between said computation units, characterized in that it comprises at least one hardware module for detecting conflicts of access of said computation units to said shared memory; said or each said hardware module for detecting conflicts being configured to:

store at least one probabilistic data structure, indicative of all the addresses of said shared memory involved in all the current transactions;

receive at least one message indicative of a request for access, by one said computation unit, to at least one address of said shared memory;

determine, from said probabilistic data structure, whether said address is already involved in a current transaction, and transmit to said computation unit a message indicating presence or absence of access conflicts; and receive at least one message indicative or confirmative of a reservation or of a releasing of at least one said address of said shared memory, and update said probabilistic data structure for the reserved addresses and the released addresses to be considered, respectively, as being/not being involved in a current transaction.

According to one embodiment, such a distributed computation system can comprise:

at least one hardware Bloom filter, preferably of the counting type, for storing said or each said probabilistic data structure;

at least one hardware Bloom filter for temporarily storing said or each said probabilistic data structure;

at least one hash function module for addressing said Bloom filters; an at least one logic circuit for managing one said message indicating presence or absence of access conflicts from said or at least one said probabilistic data structure, and for updating said or at least one said probabilistic data structure following the reception of at least one message indicative or confirmative of a reservation or of a release of at least one said address of said shared memory.

According to one embodiment, said or each said hardware module for detecting conflicts can be configured to:

receive at least one first type of message indicative of a request for access, by one said computation unit, to at least one address of said shared memory;

determine, from said probabilistic data structure, whether said address is already involved in a current transaction, and transmit to said computation unit at least one second type of message indicating presence or absence of access conflicts;

receive at least one third type of message indicative of a request to release one said shared memory address, which is no longer involved in a transaction and update said probabilistic data structure accordingly; and receive at least one fourth type of message, indicative of a validation or of an aborting of at least one said access or release request and, in case of validation, update said probabilistic data structure accordingly.

Moreover, said or each said hardware module for detecting access conflicts can comprise:

at least one first hardware Bloom filter for temporarily storing a probabilistic data structure indicative of at least one memory address indicated by a message of said first type or of said third type;

at least one second hardware Bloom filter, of the counting type, for storing said probabilistic data structure indicative of all the addresses of said shared memory involved in one or more current transactions;

at least one logic circuit for generating a message of said second type by comparison between the probabilistic data structures stored in said first and said second hardware Bloom filters, and for updating said probabilistic data structure stored in said second hardware Bloom filter on the basis of that stored temporarily in said first Bloom filter following the reception of a message of said fourth type, indicative of a validation of a request to access or release an address of said shared memory.

As a variant, said or each said hardware module for detecting access conflicts can comprise:

a first hardware Bloom filter for temporarily storing a probabilistic data structure indicative of at least one memory location indicated by at least one message of said first type, to which one said computation unit requests read access;

a second hardware Bloom filter, of the counting type, for storing a first part of said probabilistic data structure indicative of all the locations of said shared memory involved in one or more current transactions, said first part being indicative of all the locations of said shared memory involved in read mode in one or more current transactions;

a third hardware Bloom filter for temporarily storing a probabilistic data structure indicative of at least one memory location indicated by at least one message of said first type, to which one said computation unit requests write access;

a fourth hardware Bloom filter, of the counting type, for storing a second part of said probabilistic data structure indicative of all the locations of said shared memory involved in one or more current transactions, said second part being indicative of all the locations of said shared memory involved in write mode in one or more current transactions;

at least one logic circuit for generating a message of said second type by comparison between the probabilistic data structures stored in said first and said second hardware Bloom filters or said first and said fourth hardware Bloom filters, for updating said first part of said probabilistic data structure stored in said second hardware Bloom filter on the basis of that stored temporarily in said first Bloom filter following the reception of a message of said fourth type, indicative of a validation of a request to access or release a location of said shared memory, for generating a message of said second type by comparison between the probabilistic data structures stored in said third and said second hardware Bloom filters or said third and said fourth hardware Bloom filters, and for updating said second part of said probabilistic data structure stored in said fourth hardware Bloom filter on the basis of that stored temporarily in said third Bloom filter following the reception of a message of said fourth type, indicative of a validation of a request to access or release a location of said shared memory.

According to another embodiment, said or each said hardware module for detecting conflicts can be configured to:

receive at least one first type of message indicative of a request for access, by one said computation unit, to at least one location of said shared memory and update said probabilistic data structure accordingly;

determine, from said probabilistic data structure, whether said location is already involved in a current transaction, and transmit to said computation unit at least one second type of message indicating presence or absence of access conflicts;

receive at least one third type of message indicative of a request to release one said shared memory location, which is no longer involved in a transaction and update said probabilistic data structure accordingly.

In this case, said or each said hardware module for detecting access conflicts can comprise:

at least one hardware Bloom filter of the counting type for storing said probabilistic data structure indicative of all the locations of said shared memory involved in one or more current transactions; and at least one logic circuit for generating from a message of said second type from said probabilistic data structure and from a message of said first type, and for updating said probabilistic data structure stored in said hardware Bloom filter following the reception of a message of said first or said third type.

In this case, furthermore, said or each said hardware module for detecting access conflicts can comprise:

a first hardware Bloom filter, of the counting type, for storing a first part of said probabilistic data structure indicative of all the locations of said shared memory involved in one or more current transactions, said first part being indicative of all the locations of said shared memory involved in read mode in one or more current transactions; and a second hardware Bloom filter, of the counting type, for storing a second part of said probabilistic data structure, indicative of all the locations of said shared memory involved in one or more current transactions, said second part being indicative of all the locations of said shared memory involved in write mode in one or more current transactions.

According to another embodiment, said or each said hardware module for detecting access conflicts can comprise a hardware Bloom filter of the counting type for temporarily storing said or each said probabilistic data structure.

Said or each said hardware module for detecting access conflicts can comprise a first pair of Bloom filters for the detection of read access conflicts and a second pair of Bloom filters for the detection of write access conflicts.

According to one embodiment, such a distributed computation system can comprise a plurality of said hardware modules for detecting access conflicts, each associated with a segment of said shared memory.

In this case, each computation unit can comprise a memory access initiator module and a hardware acquisition module for said hardware modules for detecting access conflicts, each said hardware acquisition module being configured to perform an exclusive and atomic acquisition of the hardware module or modules for detecting access conflicts necessary to the detection of the access conflicts for a transaction.

Still in this case, furthermore, each said hardware acquisition module can be configured to:

receive at least one message indicative of a request for access, by said memory access initiator module, to an address of said shared memory; and identify, from this message, the hardware module for detecting access conflicts associated with said address;

receive and store a message indicative of a set of hardware modules for detecting access conflicts currently being used; then determine, by means of said stored message, whether said identified hardware detection module is currently being used and: if it is not, update said message indicative of a set of hardware modules for detecting access conflicts currently being used to indicate that said hardware module for detecting access conflicts is now currently being used and transmit it, and transmit to said identified hardware detection module said message indicative of an access request; otherwise transmit, without modifications, said message indicative of a set of hardware modules for detecting access conflicts currently being used; subsequently, once again receive said message indicative of a set of hardware modules for detecting access conflicts currently being used, update it to indicate that the hardware module or modules for detecting access conflicts associated with the memory address or addresses involved in said transaction are no longer currently being used and transmit it;

receive, from at least one hardware module for detecting access conflicts, at least one message indicating presence or absence of access conflicts and, if at least one said message is indicative of the presence of an access conflict, transmit to said hardware module or modules for detecting access conflicts a message to abort or cancel said or each said access request;

receive and store another message indicative of a set of hardware modules for detecting access conflicts currently being used; then receive, from said memory access initiator module, a message indicative of the completion of a transaction involving one or more addresses of said shared memory, update said stored message indicative of a set of hardware modules for detecting access conflicts currently being used to indicate that the hardware module or modules for detecting access conflicts associated with the memory address or addresses involved in said transaction are no longer currently being used and transmit it, and transmit to at least one hardware module for detecting access conflicts at least one message indicative of a request to release one said shared memory address, which is no longer involved in a transaction.

Furthermore, said hardware acquisition modules can be linked together by a communication network implementing a non-blocking exclusive access technique.

Furthermore, said hardware acquisition modules can be linked together by a network having a logical topology of ring type and be configured to transmit over said network, from one module to its neighbor, a token conveying said message indicative of a set of hardware modules for detecting access conflicts currently being used.

According to one embodiment, such a distributed computation system can comprise a plurality of tiles, said shared memory and a communication network linking said tiles together and to said shared memory and at least one said hardware module for detecting access conflicts, each said tile comprising at least one said computation unit.

Another subject of the invention is a method for using such a distributed computation system comprising the following steps:

a) using a computation unit to transmit to at least one hardware module for detecting access conflict at least one message indicative of a request to access an address of a shared memory;

b) using said or each said hardware module for detecting access conflicts to determine, from a respective probabilistic data structure, indicative of a set of addresses of said shared memory involved in a current transaction, whether said address is already involved in a current transaction, and to transmit a message indicating presence or absence of access conflicts addressed to said computation unit;

c) using said computation unit to determine, from the message or messages indicating presence or absence of access conflicts received from said or from each said hardware detection module, whether a transaction involving said or each address of said shared memory can or cannot be performed, and to transmit to said or to each said hardware detection module at least one message indicative of a reservation or of a releasing of at least one said address of said shared memory; and using said or each said detection module to update said probabilistic data structure for the reserved addresses and the released addresses to be considered, respectively, as being/not being involved in a current transaction.

According to one embodiment of such a method:

said distributed computation system can comprise a plurality of said computation units, one said shared memory and a plurality of said hardware modules for detecting access conflicts, each associated with at least one range of addresses of said shared memory;

each said computation unit comprises a memory access initiator module and a hardware acquisition module for said hardware modules for detecting access conflicts; said step a) can comprise the following operations:

a1) using a hardware acquisition module to receive and store a message indicative of a set for hardware modules for detecting access conflicts currently being used;

a2) using a memory access initiator module associated with said hardware acquisition module to transmit to said hardware acquisition module at least one said message indicative of a request to access an address of said shared memory;

a3) using said hardware acquisition module to identify the hardware module or modules for detecting access conflicts associated with said or with each said memory address;

a4) determining, by means of said message indicative of a set of hardware modules for detecting access conflicts currently being used, whether the hardware module or modules for detecting access conflicts associated with said or with each said memory device of the transaction are currently being used and: if they are not, transmitting to them said message indicative of an access request, updating said message indicative of a set of hardware modules for detecting access conflicts currently being used to indicate that said or each said hardware module for detecting access conflicts is now currently being used and transmitting it; otherwise transmitting it without modification;

and said step b) can comprise the following operations:

b1) using said hardware acquisition module to receive, from at least one hardware module for detecting access conflicts, at least one message indicating presence or absence of access conflicts and, if said or all said messages are indicative of an absence of access conflicts, transmitting to said hardware module or modules for detecting access conflicts messages confirming said access requests;

b2) using said hardware acquisition module to receive a message indicative that a transaction involving one or more addresses of said shared memory is completed, updating said message indicative of a set of hardware modules for detecting access conflicts currently being used to indicate that the hardware acquisition module or modules associated with the memory address or addresses involved in said transaction are no longer currently being used and transmitting it.

Advantageously, said hardware acquisition modules can be linked together by a communication network implementing a non-blocking exclusive access technique.

Furthermore, said hardware acquisition modules can be linked together by a network having a logical topology of ring type, said message indicative of a set of hardware modules for detecting access conflicts currently being used being transmitted over said network from one module to its neighbor.

BRIEF DESCRIPTION OF THE DRAWINGS

Other features, details and advantages of the invention will emerge on reading the description given with reference to the attached drawings given by way of example and which represent, respectively:

FIGS. 4A and 4B, the sequence diagram of a method according to an embodiment of the invention, implemented by means of the system of FIG. 1;

DETAILED DESCRIPTION

A computation system according to the invention can be implemented by means of a distributed computer architecture on chip or organized as a computation grid. In both cases, the system preferably has a modular structure, made up of "tiles" or "nodes" comprising one or more computation resources. Such a system is characterized by a distributed hardware locking mechanism which allows for the atomic acquisition of multiple hardware or software resources. This mechanism is based on a non-blocking synchronization which makes it possible to check the availability of the resources to be acquired and, if necessary, acquire them.

Compared to the transactional memories known from the prior art, such a system offers at least one of the following advantages:

it allows for an atomic reservation of several values (memory addresses); consequently, it meets the necessary and sufficient conditions to be applied to non-speculative transactional memories;

it does not depend on a software mechanism or an additional computation resource to work;

its silicon cost and its memory imprint are set for a given hardware architecture independent of any software features.

Figure 1:
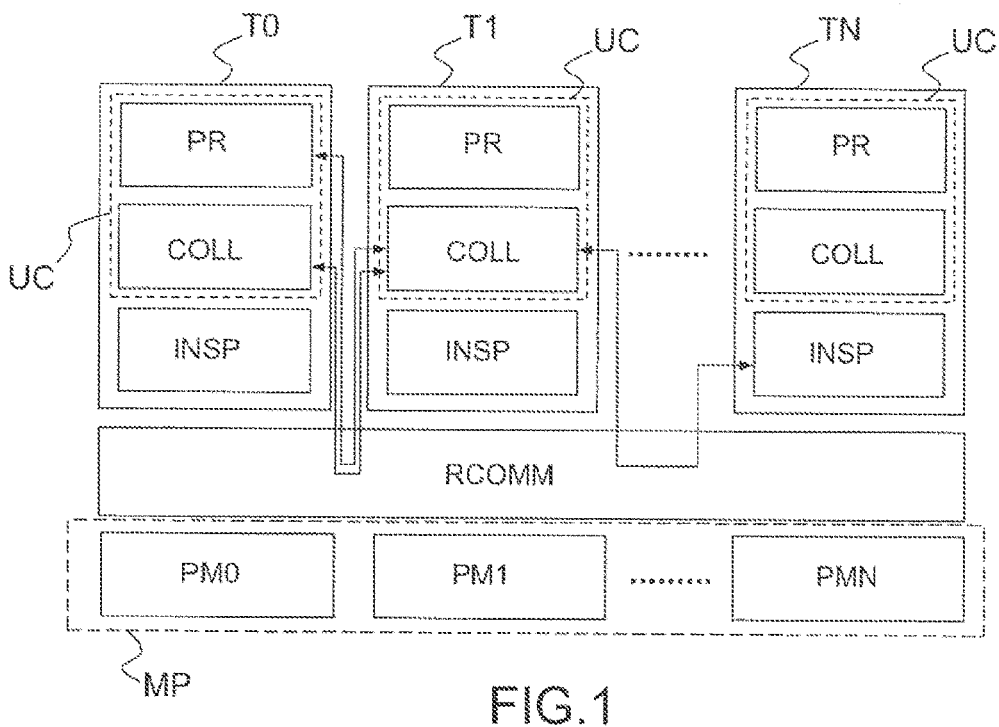
FIG. 1, the architecture of a distributed computation system according to an embodiment of the invention.

FIG. 1 illustrates the architecture of a distributed computation system according to an embodiment of the invention. This architecture comprises a plurality of "tiles" or "nodes" T0, T1, . . . , TN (single-vendor or multi-vendor), each comprising at least one computation unit UC. The architecture also comprises at least one hardware module for detecting access conflicts (also called "inspector") INSP containing the logic necessary to perform a detection of conflicts between transactions initiated by the computation units. In the case of FIG. 1, each tile comprises exactly one inspector. The system also comprises a shared memory MP made up of (N+1) memory ranges PM0, PM1, . . . , PMN, which all the computation units can access in write mode and/or in read mode, as well as a communication network RCOMM, dedicated or hierarchical, ensuring the interconnection of the tiles with one another and with the memory ranges. The network RCOMM can be a network on chip in the case of an integrated implementation of the system.

Figure 2:
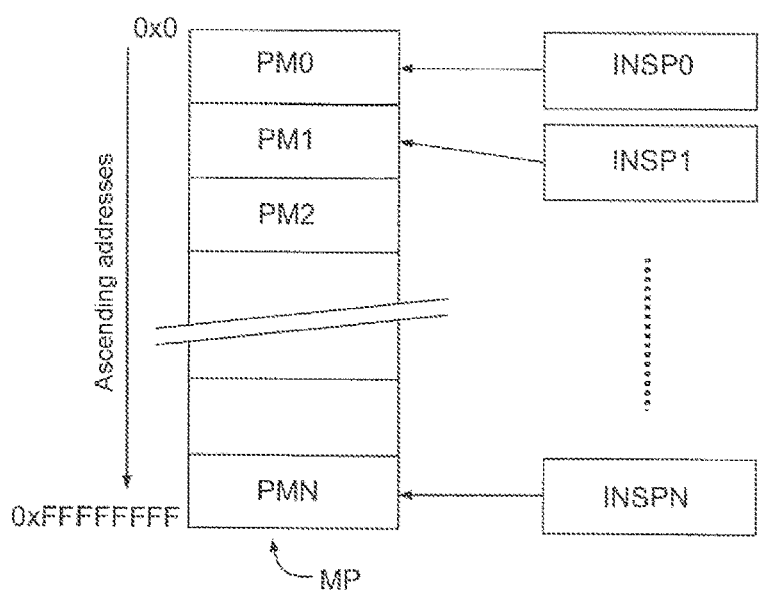
FIG. 2, the association between hardware modules for detecting access conflicts and ranges of the distributed memory of the system of FIG. 1.

As illustrated in FIG. 2, each memory range comprises a set of memory locations having consecutive addresses. Each address of the shared memory is present in a memory range. In an optimal embodiment, each address of the shared memory is present in just one memory range (case considered here). Each said memory range is associated with just one module for detecting access conflicts; thus, the module INSPi detects the conflicts which occur when several computation units seek to simultaneously access a same memory address of the range PMi, with i=0–N.

Each computation unit UC comprises a processor (or processor core, but hereinafter simply referred to as "processor") PR, which performs the data computation and processing operations and which is effectively the origin of the transactions, and an acquisition module (also called "collector") COLL which serves as interface between the processor and the modules for detecting conflicts of access to the ranges of the shared memory. Each acquisition module receives requests from the associated processor via a programming interface made up of dedicated registers (RC, RD, RS in FIG. 5A) identified by the specific memory addresses. Depending on the type of request, the acquisition module may synchronize with the other acquisition modules and/or initiate a conflict detection involving one or more modules for detecting access conflicts. These two steps form a two-phase protocol which makes it possible to perform a memory transaction.

In FIG. 1, arrows symbolically represent the exchanges of messages (which will be detailed later) between the processors and the acquisition modules, between acquisition modules, and between acquisition modules COLL and conflict detection modules INSP. All these exchanges take place by means of the network RCOMM.

Several variants of the architecture of FIG. 1 can be envisaged, without departing from the scope of the present invention. By way of nonlimiting examples:

The memory ranges can be physically integrated in the tiles or in the nodes; preferably, a same tile or node will contain the module for detecting conflicts corresponding to the memory ranges integrated in the node.

The number of memory ranges, and therefore of conflict detection modules, can be different from the number of computation units but all the memory ranges PMi are assigned to detection modules. A single conflict detection module can manage all the shared memory, but this embodiment is not optimal, particularly for a large number of processors.

The acquisition modules COLL can be absent, in which case their functionalities can be implemented, by software, by the corresponding processors (that is not necessary in the case of a single conflict detection module).

The single communication network RCOMM can be replaced by a plurality of networks dedicated to the different types of messages exchanged. In another implementation, a software solution using a shared memory can also be used for this purpose. For example, the messages can be writes or reads on memory addresses that are not hidden and that are visible to all the nodes whose integrity is guaranteed by the atomic access mechanisms.

Figure 3:
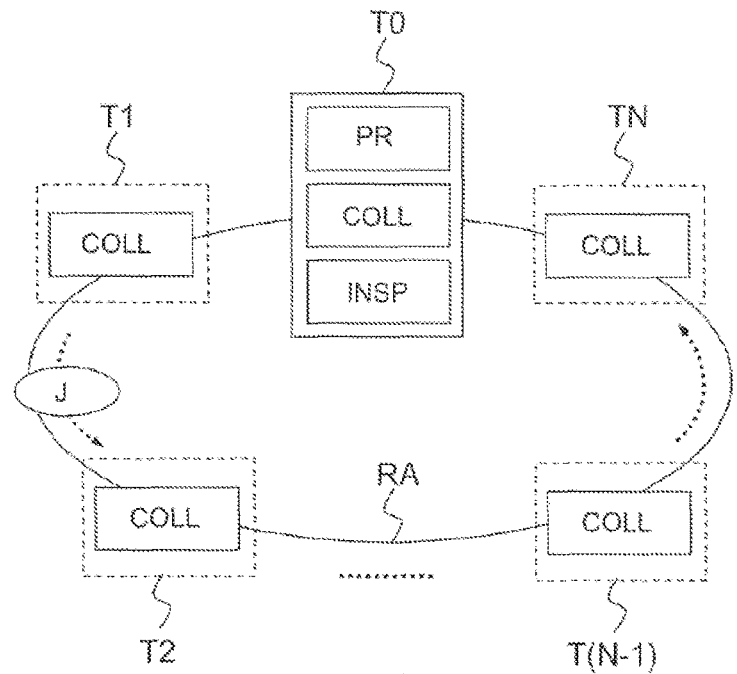
FIG. 3, the synchronization between hardware acquisition modules for the modules for detecting access conflicts in the system of FIG. 1.

The synchronization between the acquisition modules is necessary to the correct operation of the conflict detection. In effect, the characteristics of the non-speculative transactional memories require the conflict detection modules to be acquired atomically to guarantee the coherence of the transactional system. In other words, a module COLL can "acquire" a module INSP in order to check whether a transaction can be conducted correctly only if the module INSP is not already "reserved" for the checking of another transaction. According to a particular embodiment of the invention, this synchronization relies on a single and exclusive token J which circulates between the acquisition modules over a network RA having a logical ring topology, as illustrated in FIG. 3. The token J contains the state of reservation of all the modules INSP. One possible implementation consists of a bit vector, each bit representing the reservation or nonreservation of a module INSP. The network RA can correspond to a particular use of the single communication network RCOMM, or have an independent physical existence. Other embodiments can be envisaged; in fact, any atomic mechanism making it possible to acquire an exclusive right can be used. For example, the synchronizations can be writes and reads on memory addresses that are not hidden and that are visible to all the nodes whose integrity is guaranteed by atomic access mechanisms.

For a memory transaction to be able to be executed by a processor PR, the processor PR must first of all initiate a transaction start request with its acquisition module COLL and send to it the memory addresses of the data which will be used by the transaction. In the first phase of the conflict detection protocol, these addresses will be used to identify the modules INSP necessary to the detection of access conflicts. Each of these modules is identified or not as a function of the memory address ranges that it manages and of the addresses of the data of the transaction. More specifically, a module INSP is identified when at least one of the data involved in the transaction is stored in the memory range or ranges which are associated with it. On completion of this identification, the acquisition module COLL waits to receive the token to check the availability of the conflict detection modules INSP previously identified. If the conflict detection modules INSP previously identified are available, they are reserved or "acquired"—which, in the embodiment considered here, consists in updating the token. The token is then released, and the second phase can begin. Otherwise, the token is released and the acquisition module waits for the token to return to it to make a new attempt to acquire modules for detecting access conflicts. The acquisition module can also inform the processor of the unavailability of the selected modules for detecting access conflicts; in this case, the transaction is paused.

The second phase of the protocol consists of the actual detection of conflicts. For that, the acquisition module COLL sends specific requests to the identified modules INSP to proceed to the reservation of the data used by the transaction. The purpose of these requests is to check the presence or not of the data used by the transaction in the data structures stored by the corresponding modules INSP. If a datum is present in such a data structure, that means that it is already used by another transaction, which corresponds to a conflict.

At the end of the second phase of the protocol, depending on the absence or the presence of conflicts, the processor is respectively authorized or not authorized to execute the transaction and the overall state of the data reservations is updated in the modules INSP at the order of the acquisition module COLL. The modules INSP are released by the acquisition module COLL when the token returns to it. At the end of the transaction, a quite similar protocol is reused to update the overall state of the data reservations, but this time, by releasing the data used by the transaction. Consequently, in this step, the protocol does not include conflict detection.

Figure 4B:
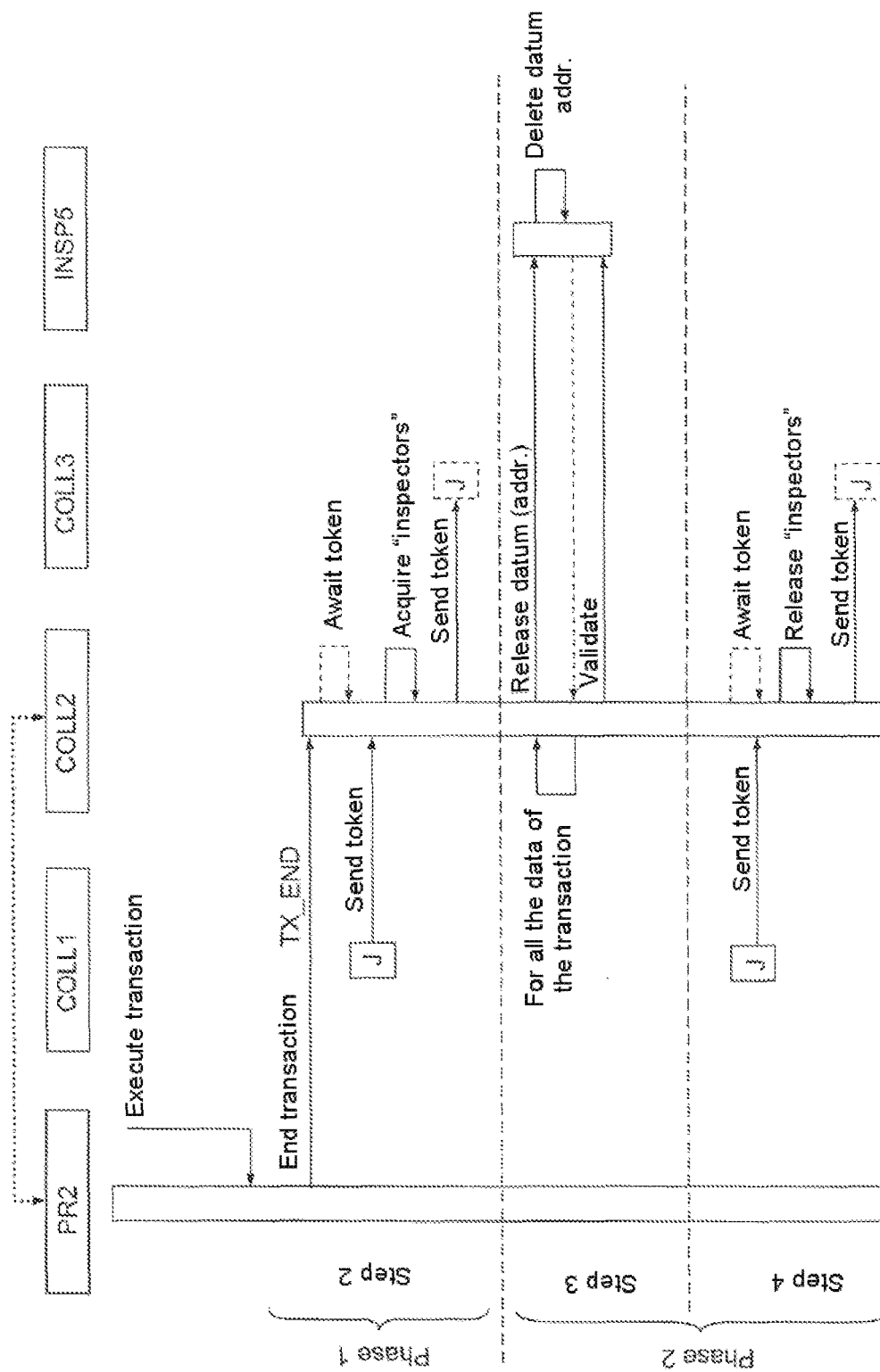

FIGS. 4A and 4B illustrate in detail the different steps of a particular embodiment of this protocol. FIG. 4A relates more specifically to the phase of reservation of the modules INSP and of the rights of access to the data of the transaction and the conflict detection phase ("preamble" of the transaction). FIG. 4B illustrates the phase of releasing of the modules INSP and of the rights of access to the transaction data ("epilog" of the transaction). These figures relate to the case where a processor PR2, assisted by the associated acquisition module COLL2, initiates a transaction involving data stored in a range PM5 of the shared memory, supervised by a conflict detection module INSP5. The acquisition modules COLL1 and COLL3, which precede and follow COLL2 in the ring network RA, intervene only for the passing of the token J. Hereinbelow, and in these figures, for conciseness purposes, the terms "collectors" and "inspectors" will be used to refer to the modules INSP and COLL, respectively.

As explained above, the preamble of the transaction (FIG. 4A) comprises a first phase (phase 1) of identification (step 1) and of reservation or "acquisition" (step 2) of the inspectors, followed by a second phase (phase 2) of detection of conflicts (step 3) and of releasing of the inspectors (step 4).

In step 1, the processor PR2 sends to the collector COLL2a "TX_START" message indicative of the start of a transaction, followed by a series of messages containing the addresses of the data involved in the transaction. As and when it receives the addresses, the collector COLL2 sends reception acknowledgments to the processor (dotted line arrows in the figure) and determines the corresponding memory ranges, and therefore inspector modules. A "TX_DATA_END" message indicates the end of the sending, and of step 1.

Step 2 begins when the token is received by the module COLL2 from the module COLL1. It consists in the acquisition (or "reservation") of the inspector modules identified in step 1 (in this case, the single module INSP5). In the embodiment considered here, the token J is a message which circulates over the ring network RA and which contains a list of the inspector modules which have been acquired by the different collector modules. When it receives the token J, the module COLL2 therefore checks whether the inspector module INSP5, which it intends to acquire, is marked as reserved in this list. In the affirmative, it releases the token by transmitting it to the module COLL3 and sets itself to wait to receive it once again; in other words, it marks INSP5 as reserved in the list (which constitutes the acquisition of this inspector module), transmits the updated token to the module COLL3 and proceeds to step 3.

At the start of step 3, the collector module COLL2 transmits to the selected and acquired inspector modules (here, the single module INSP5), messages of a first type, containing the addresses of the data affected by the transaction and corresponding to each said inspector module. This sending can be done address by address or in packets. The inspector modules comprise a memory storing a probabilistic data structure (for example a counting Bloom filter, as will be explained in detail later) indicative of the data already involved in a transaction. Each module INSP detects, using this data structure, any access conflicts and sends in response messages of a second type indicating the presence or the absence of conflicts (the conflict detection operation will be described later). A message said to be of a fourth type, a validation or abort message, is also sent to the inspector modules. More particularly, two cases can arise:

(1) When COLL2 has received all the confirmations indicating the absence of conflict for each address involved in the transaction, COLL2 sends to each inspector INSP involved in the transaction (here INSP5) a message of the fourth type indicating a validation of the transaction. The probabilistic data structure stored in each inspector module is then updated to take account of the reservation of the data involved in the transaction.

(2) Conversely, if at least one inspector detects a conflict, a message of the fourth type indicating an abort is sent by COLL2 to each inspector (here INSP5). Thus, the probabilistic data structure of each inspector concerned with the transaction remains unchanged.

Whatever the case encountered, the inspectors return a message acknowledging the transaction validation or abort message. As soon as a conflict is detected, or when no conflict is detected, the module COLL2 also sends a message to the processor PR2. The processor PR2 will then read a status register to know if there is or is not a conflict for the transaction. In the absence of conflict, the transaction can be executed. This ends step 3.

At the start of step 4, the collector module COLL2 can proceed to release the inspector modules that it has previously acquired (INSP5 in the present case), and that it no longer needs for the time being. This takes place while the processor PR2 executes the transaction. To proceed to the release of the inspector modules, it waits for the token J. On reception thereof, the collector module COLL2 updates the token J by deleting the inspector INSP5 from the list of the inspector modules acquired, and retransmits the token J to the next collector. The advantage of having a collector module COLL2 independent of the processor is that this release operation does not interfere with the execution of the transaction.

The epilog (FIG. 4B) begins after the end of the transaction, when the processor PR2 sends a "TX_END" signal to the collector module COLL2. The collector module COLL2 therefore waits for the token and, when it receives it, proceeds to acquire the inspector modules as explained above with reference to step 2 of the phase 1 of the preamble. Advantageously, the collector module keeps the addresses of the transaction data in memory, which avoids the need for the processor to retransmit them (see step 1 of the phase 1 of the preamble). Such a retransmission may nevertheless prove necessary in case of saturation of this memory. The processor is informed of this eventuality by reception acknowledgments received during step 1 of the phase 1 of the preamble.

In the phase 2/step 3 of the epilog, the collector module COLL2 transmits to the inspector module INSP5 messages of a third type, containing the addresses of the data which were affected by the transaction which has just ended. As for the reservation, this sending can be done address by address or in packets. The inspector modules proceed to release the rights of access to the addresses of the data in a way that will be detailed later, and which is symmetrical to the reservation thereof. A message of the fourth type, of validation, sent from the collector COLL2 to the inspector INSP5, completes the phase of releasing of the data. The epilog of the transaction is completed with a fourth step of releasing of the inspector modules (here INSP5), identical to the corresponding step of the preamble, except that the inspector modules marked as reserved and affected by the transaction which is ending are marked as being free.

Figure 5A:
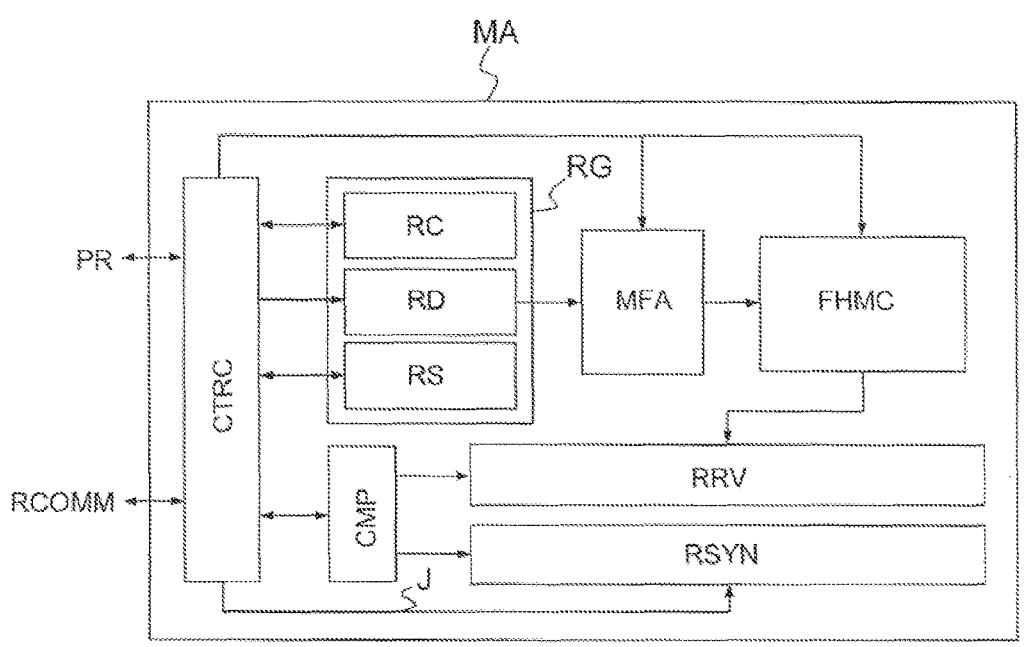
FIGS. 5A and 5B, respectively, the functional diagram of a hardware acquisition module for the modules for detecting access conflicts according to a possible embodiment of the system of FIG. 1 and a diagram illustrating the operation of checking availability of the modules for detecting access conflicts.

FIG. 5A illustrates a functional diagram of an acquisition module (or "collector") COLL that can be used for the implementation of the protocol described above with reference to FIGS. 4A and 4B. This module comprises:

a controller CTRC which manages all the operations performed by the collector, namely:
(1) the exchange of messages with the processor PR (via a dedicated interface) and with the acquisition modules (via the network RCOMM), and
(2) the synchronization with the other collectors (also via the network RCOMM, which may include a dedicated ring network). This controller can comprise, or consist of, a state machine and, if necessary, one or more interface circuits.

A set RG of general registers, comprising in particular a command register RC, a data register RD and a status register RS. These registers are accessible from the associated processor (via the controller CTRC) and allow the exchange of data between the associated processor and the collector module. They are associated with specific memory addresses and thus constitute a programming interface for the processor PR. More specifically, the processor writes into the register RC the commands "TX_START", "TX_DATA_END" and "TX_END" mentioned above, which control the operation of the controller CTRC. It writes into the register RD the addresses of the data to be reserved (and, if necessary, to be released) and reads in the register RS the presence or absence of an access conflict (or of an error, or of a data structure overflow).

A temporary storage memory MFA, implementing a queue for the addresses sent by the processor. This memory makes it possible to limit the repeated sending of the same addresses to the collector during the different steps of a transaction (prolog and epilog). In particular, the presence of this memory makes it possible to avoid the retransmission of the addresses of the data to be released in the epilog of the transaction. Such a retransmission remains necessary in case of saturation of the memory.

A module FHMC performing, by hardware, a hash function, which makes it possible to select a single inspector module from an address value sent from the processor. The result of the hashing, for its part, makes it possible to set to one the bit corresponding to the selected inspector in the reservation register (see below). Each FHMC module performs the same hash function, thus each address is associated with a same inspector module regardless of the collector concerned.

A reservation register RRV and a synchronization register RSYN, and a bit-to-bit comparator CMP between these registers to check the availability of the "inspector" modules required for a transaction. Each of the registers RRV and RSYN comprises a memory cell with one bit for each inspector module of the system.

As mentioned above, at the start of the prolog of a transaction, the processor writes into the command register RC of the collector module which is associated with it a "TX_START" command in order to notify it that a new transaction is initiated. Then, the processor sends each data address by writing it into the data register RD. Each write in this register generates a backup of the value of the address of the data in the queue of storage MFA and is also transmitted to the hashing module FHMC. The module FHMC returns a value corresponding to an index in the reservation register RRV. This index represents the inspector module responsible for the range of addresses containing the address of the datum previously transmitted to the collector. The end of the sequence of sending of the addresses of the data to the collector is marked by the writing, into the command register RC by the processor PR, of a "TX_DATA_END" command. At the end of this sending, the reservation register RRV represents the set of inspector modules necessary for the detection of conflicts for the new transaction. Each bit of RRV at "1" represents an inspector to be acquired.

Next, the collector module COLL receives, via the controller CTRC, the token J which runs between the different collector modules and which contains a list of the inspector modules already acquired (which avoids having to access a centralized memorizing element). In this embodiment, the token J is made up of a word of n bits. Each bit of J thus represents the reservation, or not, of an inspector INSP. The token J received by the module COLL is temporarily stored in the synchronization register RSYN.

Figure 5B:
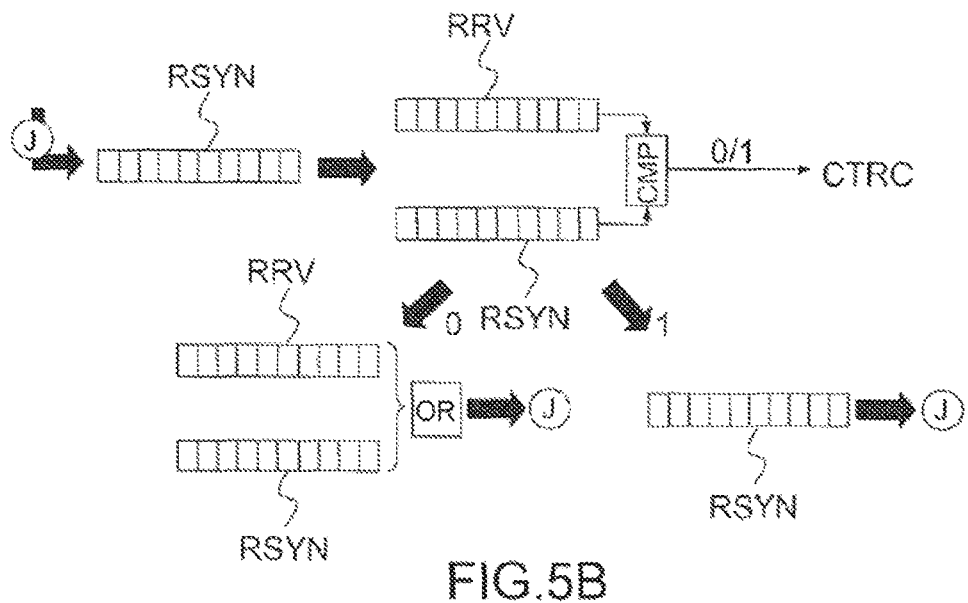

The checking of the availability of the inspector modules awaiting acquisition is done by performing, by means of the comparator CMP, a bit-to-bit comparison between the reservation register RRV and the synchronization register RSYN. The result—for example a "0" value if all the inspector modules to be reserved are available, a "1" value if at least one is not—is transmitted to the controller CTRC. If none of the inspector modules awaiting acquisition is already used by another transaction (output "0" from the comparator), then the synchronization register (and therefore the value of the token J) is updated to reflect the acquisition of the inspector modules by the collector. This can be done via a bit-for-bit "OR" operation on the registers RRV and RSYNC for example. By contrast, if an inspector module is already used by another transaction (and therefore the corresponding bit is at "1" in the synchronization register, which is reflected in a "1" output from the comparator), then the value of the token is not updated and the collector transfers the token to the next collector, waiting for it to come back to it on the next round. FIG. 5B illustrates this protocol of synchronization between collectors.

If it receives a "0" value from the comparator, the controller CTRC can trigger the phase of reservation of the data, which consists in sending the address of each of them to the corresponding inspector modules in order to search for the presence of any conflict with another transaction. The data (more specifically their addresses) temporarily stored in the memory MFA are reused if the memory MFA has sufficient capacity; otherwise, the processor must resend the transaction data in the same way as in the first step.

The reservation of the data is performed by a specific exchange protocol between the collector and the inspectors, implemented via the controller CTRC. Each request sent by the collector contains the memory address of the datum. The response from the inspector contains two flags: an acknowledgement and the presence of a conflict or of an overflow. The first request sent to an inspector also contains a command making it possible to distinguish the acquisition and release requests. The acknowledgement, received from the inspector in response to the sending of each address, makes it possible to ensure that the search for conflicts has indeed been performed. The status register RS is updated on each response from an inspector according to the presence of an error, of a conflict, of an overflow or any combination of these three events. The register is read by the processor, which is thus informed of the possible presence of access conflict making the transaction impossible. At the end of the sending of all the data of the reservation request the collector sends to each inspector a last message containing a validation command (in the absence of access conflicts) or abort command (in the presence of at least one such conflict) coded on two bits.

At the end of the prolog, after the reception, the inspector modules which have been used are released in the same way as they were acquired. For that, when the token passes through the collector, a bit-for-bit "AND" operation is used (the reverse of the bit-for-bit "OR" for the acquisition) between the reservation register (unchanged) 1's complemented (all the bits inverted) and the synchronization register. Thus, each bit corresponding to an inspector identified by the reservation register is set to "0".

The epilog, executed after the end of the transaction, is very similar to the prolog, except that there is no detection of conflicts.

Figure 6A:
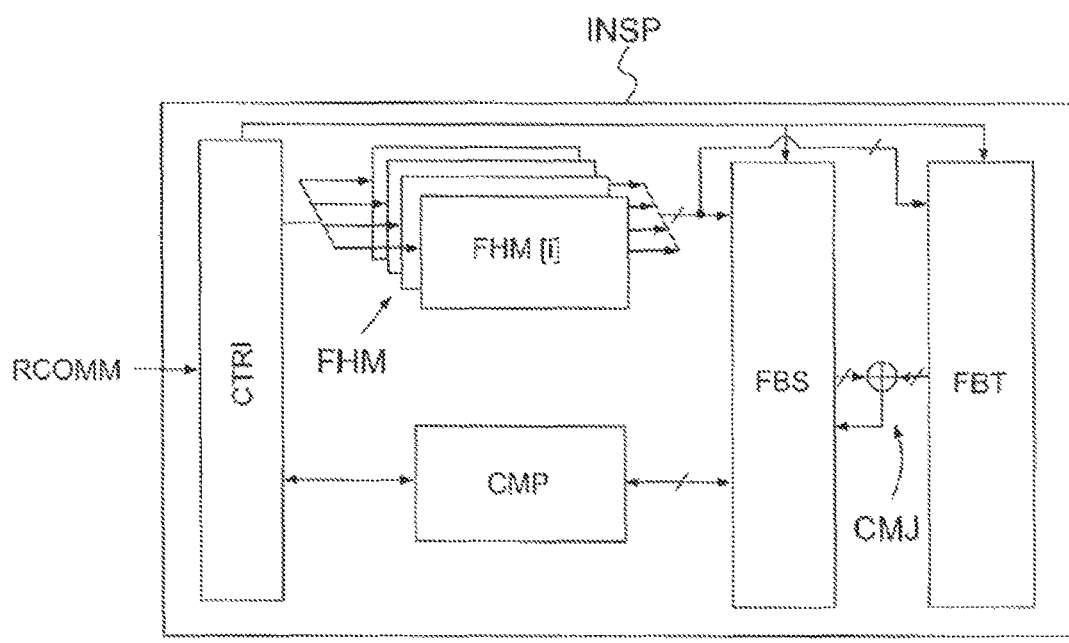
FIGS. 6A and 6B, respectively, the functional diagram of a hardware module for detecting access conflicts and a diagram illustrating the operation of reservation and releasing of the data according to a possible embodiment of the system of FIG. 1.

FIG. 6A illustrates a functional diagram of a module for detecting access conflicts (or "inspector") INSP that can be used for the implementation of the protocol described above with reference to FIGS. 4A and 4B. This module comprises:

- a controller CTRI containing a state machine. This controller forms the interface between the module and the interconnection network RCOMM and manages the different steps of the conflict detection, which will be detailed hereinbelow.
- A module FHM containing a set of hardware hash function modules denoted FHM[i]. Each module FHM[i] performs, by hardware, a hash function on each address indicative of a datum to be reserved. Thus, each address is converted by the module FHM into a set of shorter binary "words" which will be used to address the Bloom filters FBT and FBS. The size of the outputs of the block FHM is thus dependent on the size of the Bloom filters.
- A so-called "temporary" Bloom filter FBT which contains n storage elements FBT[0] to FBT[n−1]. Each storage element FBT[i] contains a Boolean 1 value if it has been addressed by the FHM in the access request corresponding to a transaction to be executed, and takes the value 0 otherwise.
- A so-called "backup" counting Bloom filter FBS, having a number n of storage elements equal to that of the temporary Bloom filter FBT. The storage elements are denoted FBS[0] to FBS[n−1]. They will be updated from the FBT in case of success on completion of the acquisition of all the addresses involved in the transaction. Each storage element FBS[i] contains the number of times that FBT[i] has had the value 1 for all the transactions previously authorized for execution. This module retains this information for all the current transactions.
- A comparator CMP takes as input the storage elements of FBS selected by the FHM for each address indicative of a datum to be reserved. It checks that at least one of the storage elements has the value 0. In the positive case, that is to say if there is at least one 0, this means that the address is available. In the negative case, that is to say if there is no storage element at 0, that means that the address cannot be reserved because it is already probably reserved (only "probably", because there is a risk of false positive). The requesting transaction must then be canceled. In all cases, the corresponding information is returned to the controller CTRI.

For information, a Bloom filter is a compact probabilistic data structure well known in the state of the art, used to perform tests of presence of an element in a set. A Bloom filter makes it possible to determine with certainty the absence of the element in the set (there can be no false negatives), and probabilistically the presence of said element in the set (a non-zero rate of false positives is accepted). The size of a Bloom filter does not depend on the number of elements contained in the set, which allows for a great compactness; nevertheless, a trade-off has to be found between the size of the filter and the rate of false positives that can be tolerated. The case of the so-called "ordinary" Bloom filter FBT concerns binary storage elements, whereas the case of the "counting" Bloom filter FBS concerns counters capable of storing integer values (there is nothing to prevent having two counting Bloom filters, with one of them used as an ordinary filter).

For the implementation of the invention, preference is given to "hardware" Bloom filters, that is to say produced by means of dedicated logic circuits.

The controller CTRI is responsible for driving the various steps of the conflict detection described hereinbelow and repeated for each address involved in the current transaction upon the reservation request:

Step 1: a memory address involved in the transaction is presented to the controller CTRI via the communication network RCOMM following a sending by a collector.

Step 2: the value of the address is propagated to the module FHM. This module returns a set of indices which each identify a storage element in the Bloom filters FBT and FBS.

Step 3: the storage elements of FBT identified by these indices take a "1" value, the others retain their values.

Step 4: the contents of the storage elements of the storage Bloom filter FBS identified by the module FHM are transmitted to the comparator CMP.

Step 5: the comparator CMP uses the values sent by the storage Bloom filter FBS to search for the presence of a conflict. A conflict is identified if none of the values received has a 0 value. Whether there is or is not a conflict, the corresponding information is returned to the controller CTRI.

Step 6: the presence or the absence of a conflict and/or overflow is notified by the controller CTRI to the collector module COLL.

Step 7: when all the addresses involved in the current transaction have not culminated in the identification of a conflict, the module FBS is updated from the module FBT. The content of the module FBS becomes the sum of the content of the module FBT with itself. In case of overflow of the value accumulated on FBS, this event is sent to the CTRI which itself notifies COLL thereof to cancel the transaction. The content of the FBS is then kept at its old value.

When all the addresses of the reservation request have been processed and no conflict and overflow has been detected, the requesting transaction is authorized for execution, as was explained above.

Figure 6B:
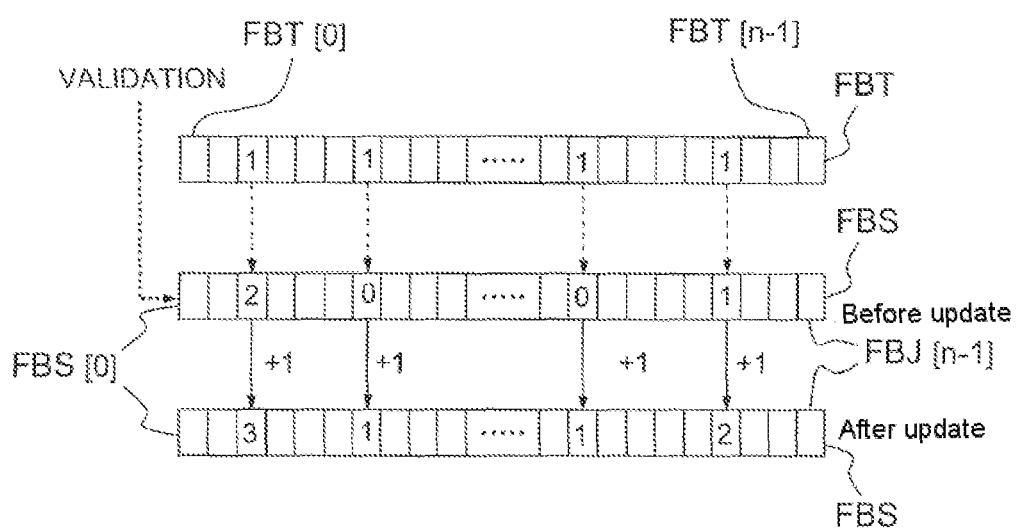

If the controller CTRI receives a validation message from the module COLL via the network RCOMM, a logic circuit CMJ (an adder) updates the state of the reservations by incrementing the counters of the backup Bloom filter whose indices correspond to a "1" bit in the temporary Bloom filter, as illustrated in FIG. 6B. Conversely, in the abort case, the backup Bloom filter remains unchanged. In both cases, the temporary Bloom filter is reset to zero.

The releasing of the data at the end of the epilog of the transaction is performed in a similar manner but without conflict detection, the counters of the backup Bloom filter being decremented instead of incremented.

The properties of the Bloom filters are such that all the access conflicts will be detected (absence of false negatives), but that some transactions will be prevented even in the absence of real access conflicts (possibility of having false positives).

As is known per se, the various hardware modules of the system will be able to be produced from dedicated logic circuits and/or from programmable components such as FPGAs.

The invention has been described with reference to a particular embodiment. However, many variants can be envisaged. The following list is not exhaustive.

Preferably, a distributed computation system according to the invention comprises a plurality of conflict detection modules, associated with respective ranges of the shared memory—as is the case in the embodiment described in detail above. This in effect makes it possible for transactions using data situated in separate respective address ranges to detect their conflicts (or reserve or release their data) in parallel. A serialization of the conflict detections which would be imposed by the use of a single conflict detection module and which could constitute a bottleneck for the system is thus avoided. However, as explained above, a computation system according to a first alternative embodiment of the invention may comprise only a single module for detecting access conflicts (inspector) which, consequently, manages all the memory space addressable by the different processors. In this case, the acquisition modules no longer need reservation registers. A form of synchronization must however be maintained to avoid two collectors simultaneously accessing this single inspector module; this synchronization can, for example, be ensured by a binary token. Such an embodiment may be advantageous if the number of computation units is limited.

According to a second alternative embodiment, the acquisition modules may not have any temporary storage memory MFA. However, in case of absence of this submodule, the processor must return the addresses of the transaction data at each step because the transaction data are no longer stored in the acquisition module.

According to a third alternative embodiment, the step of releasing of the modules for detecting access conflicts before the end of the prolog and of the epilog can be omitted. This variant is particularly relevant in the case of a multiprocessor architecture of large size for reducing the waiting time.

Figure 7:
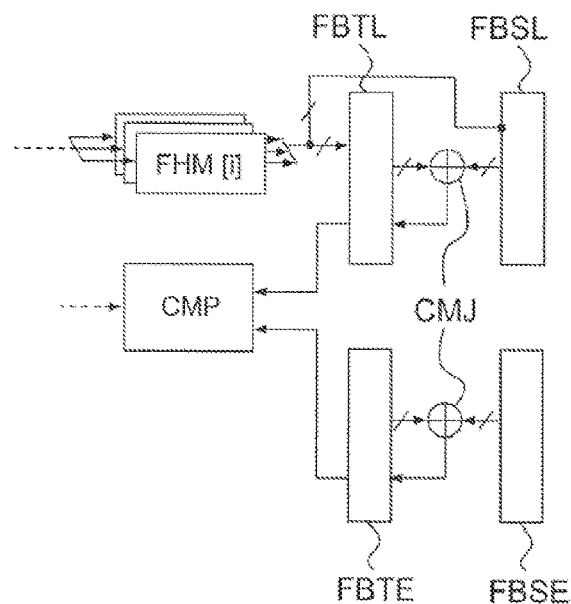
FIG. 7, a detail of the functional diagram of a hardware module for detecting access conflicts according to another possible embodiment of the system of FIG. 1.

According to a fourth alternative embodiment, each conflict detection module can contain two pairs of Bloom filters: one pair FBTL, FBSL for the data read and one pair FBTE, FBSE for the data written (see FIG. 7). An item of information in the reservation messages transmitted from the processor to the acquisition module, and from the acquisition module to the conflict detection module, makes it possible to distinguish the read and write accesses. The detection of conflicts is then more accurate. A conflict must then be detected only if at least one write in a transaction takes place at an address used in the read mode by other transactions. For the reservation of the access to a datum in write mode, there is conflict when the address of the datum is present in the filter FBSE or FBSL. For the reservation of the access to a datum in read mode, there is conflict only when the address of the datum is present in the filter FBSE.

Figure 8:
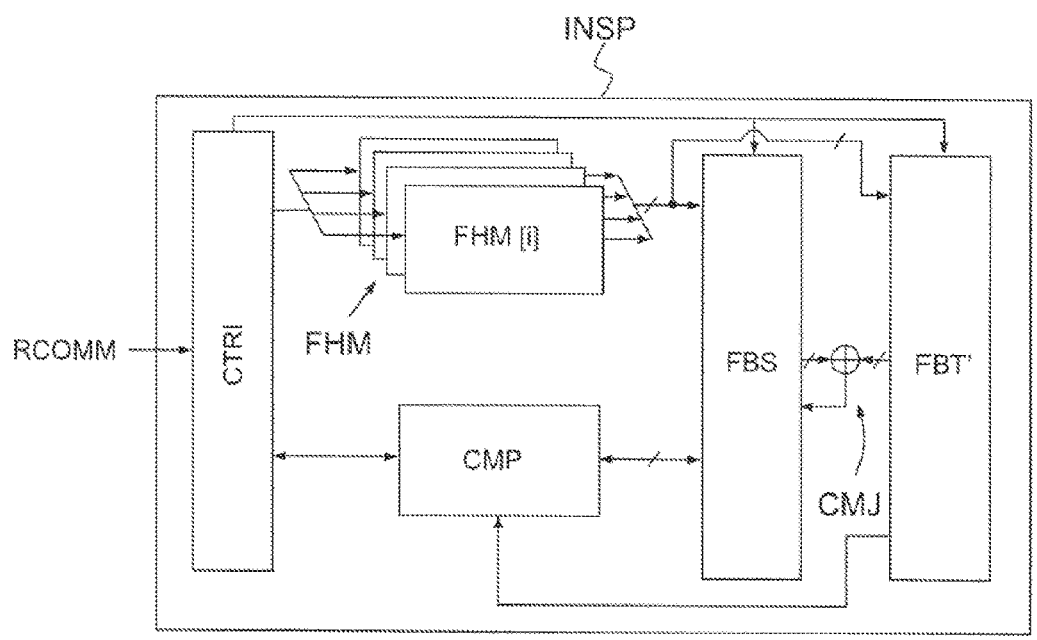
FIG. 8, the functional diagram of a hardware module for detecting access conflicts according to another embodiment of the system of FIG. 1.

According to a fifth alternative embodiment, illustrated in FIG. 8, both the temporary Bloom filter FBT' and the backup Bloom filter FBS can be of the counting type. The counters of the temporary Bloom filter FBT' are incremented as and when the messages of the first type are received, so at the end of the reservation step this filter contains a vector of integer values constituting a digital signature of the transaction. Upon the reception of a transaction validation message (fourth type), these integer values are added to the corresponding counters of the backup Bloom filter FBS. In the phase of releasing of the data, the release messages (third type) directly decrement the counters of the backup Bloom filter FBS, without involving the temporary Bloom filter FBT'. There is therefore no need for a confirmation message (fourth type) in said release phase. Thus, in this embodiment, a reduction of the number of messages exchanged is obtained at the price of a slight increase in the hardware complexity of the modules for detecting access conflicts.

These different alternative embodiments can be combined with one another. In particular, in the fifth alternative embodiment, each Bloom filter can be replaced by a pair of Bloom filters dedicated to read and write accesses (see the fourth alternative embodiment and FIG. 7).

Moreover, the Bloom filters—binary or counting—are not the only probabilistic data structures that can be used in the context of the invention. Another example of such a probabilistic data structure is the "count-min-sketch". Like the Bloom filters, it uses hash functions; however, its role is to count the occurrence of an element in a stream, and not the belonging of an element to a set. Applying a "count-min-sketch" to a transactional memory necessarily involves proceeding as follows. First of all, consider that the sequence of addresses deriving from the memory accesses of a transaction constitutes a stream. Then, determine a conflict between two transactions by comparing the occurrences of the addresses in the respective streams by means of a "count-min-sketch". This structure can be implemented by software or hardware.

The invention claimed is:

1. A distributed computation system comprising a plurality of computation units and at least one shared memory shared between said computation units, also comprising at least one hardware module for detecting conflicts of access of said computation units to said shared memory; wherein said hardware module or each said hardware module for detecting conflicts comprises:
at least one hardware Bloom filter configured for temporarily storing a first probabilistic data structure, indicative of at least one address of said shared memory for which an access request has been received;
at least one second hardware Bloom filter, of the counting type, configured for storing a second probabilistic data structure, indicative of all addresses of said shared memory involved in all the transactions already in progress;
at least one hash function module configured for addressing said first and second Bloom filters; and
a logic circuit configured to:
receive a message indicative of a request for access, by one said computation unit, to at least one address of said shared memory;
update the first probabilistic data structure stored in the first hardware Bloom filter for it to be indicative of said address;
determine, from the probabilistic data structures stored in said first and second Bloom filters, whether said address is already involved in a current transaction;
generate and transmit to said computation unit a message indicating presence or absence of access conflicts; and to
receive at least one message indicative or confirmative of a reservation or of a releasing of at least one said address of said shared memory, and update said second probabilistic data structure stored in the second hardware Bloom filter for the reserved addresses and the released addresses to be considered, respectively, as being or not being involved in a current transaction,
wherein said logic circuit of said hardware module for detecting conflicts or each said hardware module for detecting conflicts is configured to:
receive at least one first type of message indicative of a request for access, by one said computation unit, to at least one address of said shared memory;
determine, from said first and second probabilistic data structure, whether said address is already involved in a current transaction, and transmit to said computation unit at least one second type of message indicating presence or absence of access conflicts;
receive at least one third type of message indicative of a request to release one said shared memory address, which is no longer involved in a transaction and update said second probabilistic data structure accordingly; and
receive at least one fourth type of message, indicative of a validation or of an aborting of at least one said access or release request and, in case of validation, update said second probabilistic data structure accordingly.

2. The distributed computation system of claim 1, wherein said logic circuit is configured to generate a message of said second type by comparison between the probabilistic data structures stored in said first and said second hardware Bloom filters, and to update said second probabilistic data structure stored in said second hardware Bloom filter on the basis of the first probabilistic data structure stored temporarily in said first Bloom filter following the reception of a message of said fourth type, indicative of a validation of a request to access or release an address of said shared memory.

3. The distributed computation system of claim 2, wherein said first hardware Bloom filter is also of the counting type.

4. The distributed computation system of claim 2, wherein said hardware module for detecting access conflicts or each said hardware module for detecting access conflicts comprises a first pair of Bloom filters configured for the detection of read access conflicts and a second pair of Bloom filters configured for the detection of write access conflicts.

5. The distributed computation system of claim 1, comprising a plurality of said hardware modules for detecting access conflicts, each associated with a segment of said shared memory.

6. The distributed computation system of claim 5, wherein each computation unit comprises a memory access initiator module and a hardware acquisition module for said hardware modules for detecting access conflicts, each said hardware acquisition module being configured to perform an exclusive and atomic acquisition of the hardware module or modules for detecting access conflicts necessary to the detection of the access conflicts for a transaction.

7. The distributed computation system of claim 6, wherein said logic circuit of each said hardware acquisition module is configured to:
receive at least one message indicative of a request for access, by said memory access initiator module, to an address of said shared memory; and identify, from this message, the hardware module for detecting access conflicts associated with said address;
receive and store a message indicative of a set of hardware modules for detecting access conflicts currently being used; then determine, by means of said stored message, whether said identified hardware detection module is currently being used and: if it is not, update said message indicative of a set of hardware modules for detecting access conflicts currently being used to indicate that said hardware module for detecting access conflicts is now currently being used and transmit it, and transmit to said identified hardware detection module said message indicative of an access request; otherwise transmit, without modifications, said message indicative of a set of hardware modules for detecting access conflicts currently being used; subsequently, once again receive said message indicative of a set of hardware modules for detecting access conflicts currently being used, update it to indicate that the hardware module or modules for detecting access conflicts associated with the memory address or addresses involved in said transaction are no longer currently being used and transmit it;

receive, from at least one hardware module for detecting access conflicts, at least one message indicating presence or absence of access conflicts and, if at least one said message is indicative of the presence of an access conflict, transmit to said hardware module or modules for detecting access conflicts a message to abort or cancel said or each said access request;

receive and store another message indicative of a set of hardware modules for detecting access conflicts currently being used; then receive, from said memory access initiator module, a message indicative of the completion of a transaction involving one or more addresses of said shared memory, update said stored message indicative of a set of hardware modules for detecting access conflicts currently being used to indicate that the hardware module or modules for detecting access conflicts associated with the memory address or addresses involved in said transaction are no longer currently being used and transmit it, and transmit to at least one hardware module for detecting access conflicts at least one message indicative of a request to release one said shared memory address, which is no longer involved in a transaction.

8. The distributed computation system of claim 7, wherein said hardware acquisition modules are linked together by a communication network implementing a non-blocking exclusive access technique.

9. The distributed computation system of claim 8, wherein said hardware acquisition modules are linked together by a network having a logical topology of ring type and are configured to transmit over said network, from one module to its neighbor, a token conveying said message indicative of a set of hardware modules for detecting access conflicts currently being used.

10. The distributed computation system of claim 6, comprising a plurality of tiles, said shared memory and a communication network linking said tiles together and to said shared memory and at least one said hardware module for detecting access conflicts, each said tile comprising at least one said computation unit.

11. A method for using a distributed computation system comprising a plurality of computation units and at least one shared memory shared between said computation units, also comprising at least one hardware module for detecting conflicts of access of said computation units to said shared memory; wherein said hardware module or each said hardware module for detecting conflicts comprises:

at least one hardware Bloom filter configured for temporarily storing a first probabilistic data structure, indicative of at least one address of said shared memory for which an access request has been received;

at least one second hardware Bloom filter, of the counting type, configured for storing a second probabilistic data structure, indicative of all addresses of said shared memory involved in all the transactions already in progress; and at least one hash function module configured for addressing said first and second Bloom filters;

the method comprising the following steps:

a) using a computation unit to transmit to at least one hardware module for detecting access conflict at least one message indicative of a request to access an address of a shared memory;

b) using said or each said hardware module for detecting access conflicts to determine, from a respective probabilistic data structure, indicative of a set of addresses of said shared memory involved in a current transaction, whether said address is already involved in a current transaction, and to transmit a message indicating presence or absence of access conflicts addressed to said computation unit;

c) using said computation unit to determine, from the message or messages indicating presence or absence of access conflicts received from said or from each said hardware detection module, whether a transaction involving said or each address of said shared memory can or cannot be performed, and to transmit to said or to each said hardware detection module at least one message indicative of a reservation or of a releasing of at least one said address of said shared memory; and using said or each said detection module to update said probabilistic data structure for the reserved addresses and the released addresses to be considered, respectively, as being or not being involved in a current transaction, wherein:

said distributed computation system comprises a plurality of said computation units, one said shared memory and a plurality of said hardware modules for detecting access conflicts, each associated with at least one range of addresses of said shared memory;

each said computation unit comprises a memory access initiator module and a hardware acquisition module for said hardware modules for detecting access conflicts;

wherein said step a) comprises the following operations:

using a hardware acquisition module to receive and store a message indicative of a set of hardware modules for detecting access conflicts currently being used;

using a memory access initiator module associated with said hardware acquisition module to transmit to said hardware acquisition module at least one said message indicative of a request to access an address of said shared memory;

using said hardware acquisition module to identify the hardware module or modules for detecting access conflicts associated with said or with each said memory address;

determining, by means of said message indicative of a set of hardware modules for detecting access conflicts currently being used, whether the hardware module or modules for detecting access conflicts associated with said or with each said memory address of the transaction are currently being used and if they are not, transmitting to them said message indicative of an access request, updating said message indicative of a set of hardware modules for detecting access conflicts currently being used to indicate that said or each said hardware module for detecting access conflicts is now currently being used and transmitting it; otherwise transmitting it without modification; and wherein said step b) comprises the following operations:

using said hardware acquisition module to receive, from at least one hardware module for detecting access conflicts, at least one message indicating presence or absence of access conflicts and, if said or all said messages are indicative of an absence of access conflicts, transmitting to said hardware module or modules for detecting access conflicts messages confirming said access requests;

using said hardware acquisition module to receive a message indicative that a transaction involving one or more addresses of said shared memory is completed, updating said message indicative of a set of hardware modules for detecting access conflicts currently being used to indicate that the hardware acquisition module or modules associated with the memory address or addresses involved in said transaction are no longer currently being used and transmitting it.

12. The method of claim 11, wherein said hardware acquisition modules are linked together by a communication network implementing a non-blocking exclusive access technique.

13. The method of claim 12, wherein said hardware acquisition modules are linked together by a network having a logical topology of ring type, said message indicative of a set of hardware modules for detecting access conflicts currently being used being transmitted over said network from a module to its neighbor.

* * * * *